US007767048B2

(12) United States Patent
Kanbayashi

(10) Patent No.: US 7,767,048 B2
(45) Date of Patent: Aug. 3, 2010

(54) ELECTRONIC APPARATUS AND METHOD FOR MANUFACTURING ELECTRO-OPTICAL DEVICE

(75) Inventor: Hatsuki Kanbayashi, Suwa (JP)

(73) Assignee: Seiko Epson Corporation (JP)

( * ) Notice: Subject to any disclaimer, the term of this patent is extended or adjusted under 35 U.S.C. 154(b) by 760 days.

(21) Appl. No.: 11/670,105

(22) Filed: Feb. 1, 2007

(65) Prior Publication Data

US 2007/0176309 A1   Aug. 2, 2007

(30) Foreign Application Priority Data

Feb. 2, 2006   (JP)   ............... 2006-025763
Dec. 8, 2006   (JP)   ............... 2006-331759

(51) Int. Cl.
*G09G 3/34* (2006.01)
(52) U.S. Cl. ............... 156/196; 359/296; 345/107; 345/84; 430/32; 445/24
(58) Field of Classification Search ............... 359/296; 345/107, 84; 430/32; 156/196; 445/24
See application file for complete search history.

(56) References Cited

U.S. PATENT DOCUMENTS 5,273,475 A * 12/1993 Oshikawa ............... 445/24

2007/0152956 A1 * 7/2007 Danner et al. ............... 345/107

FOREIGN PATENT DOCUMENTS

| JP | 64-086116 | 3/1989 |
|---|---|---|
| JP | 10-149118 | 6/1998 |
| JP | 2006-171688 | 6/2006 |

* cited by examiner

*Primary Examiner*—Jeff Aftergut
*Assistant Examiner*—Jaeyun Lee
(74) *Attorney, Agent, or Firm*—Harness, Dickey & Pierce, P.L.C.

(57) ABSTRACT

A method for manufacturing the following device is provided: an electro-optical device which includes a pair of substrates holding a display material having optical properties varied by electric stimulation and which has a curved shape. The method includes covering the front and rear faces of a display with a pair of protective films and then bonding end portions of the protective films to each other with an adhesive containing a thermoplastic resin, the end portions being located outside the display; heating the bonded end portions to melt the adhesive and then bending the display depending on applications; and solidifying the melted adhesive by cooling to allow the protective films to hold the display bent.

3 Claims, 5 Drawing Sheets

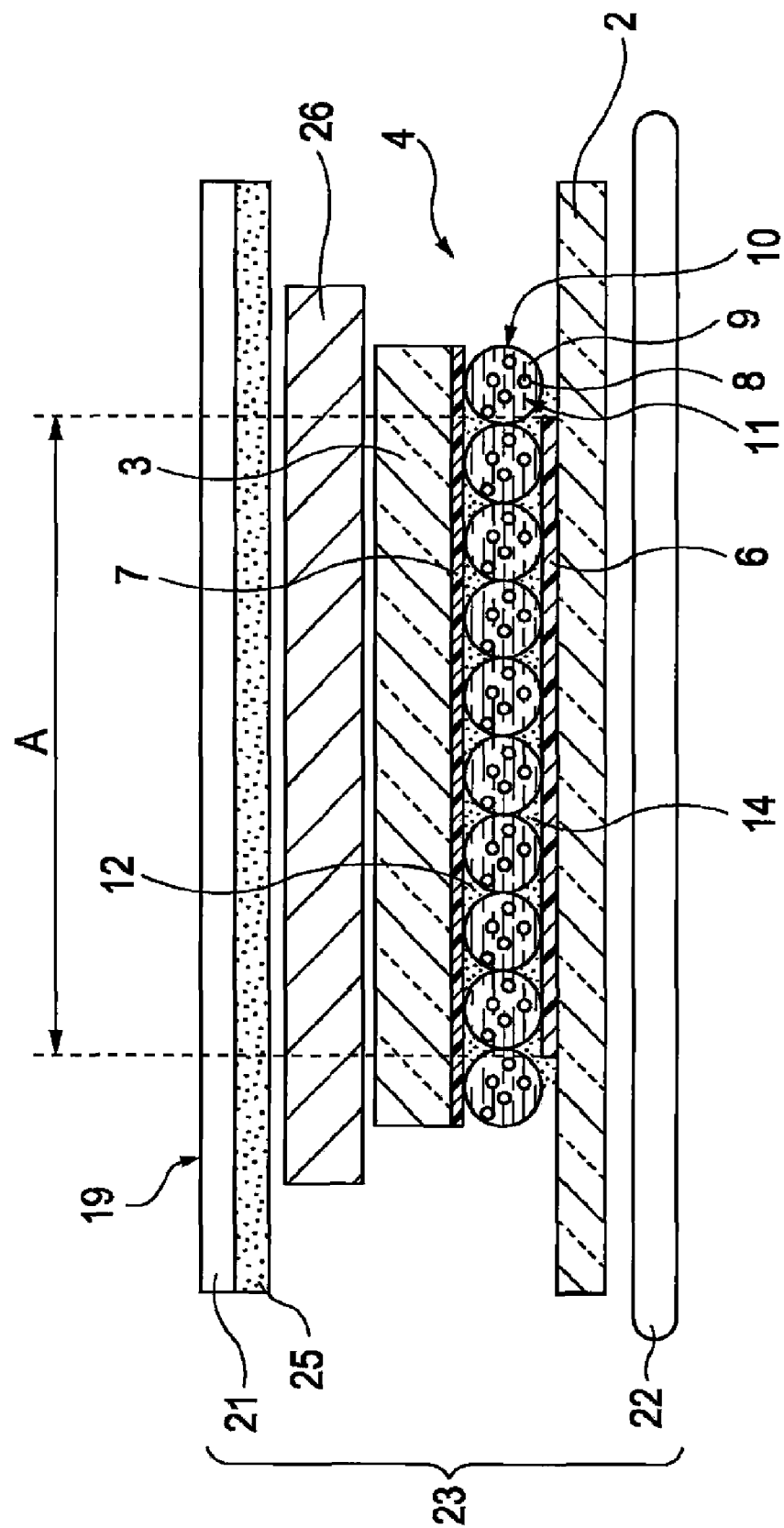

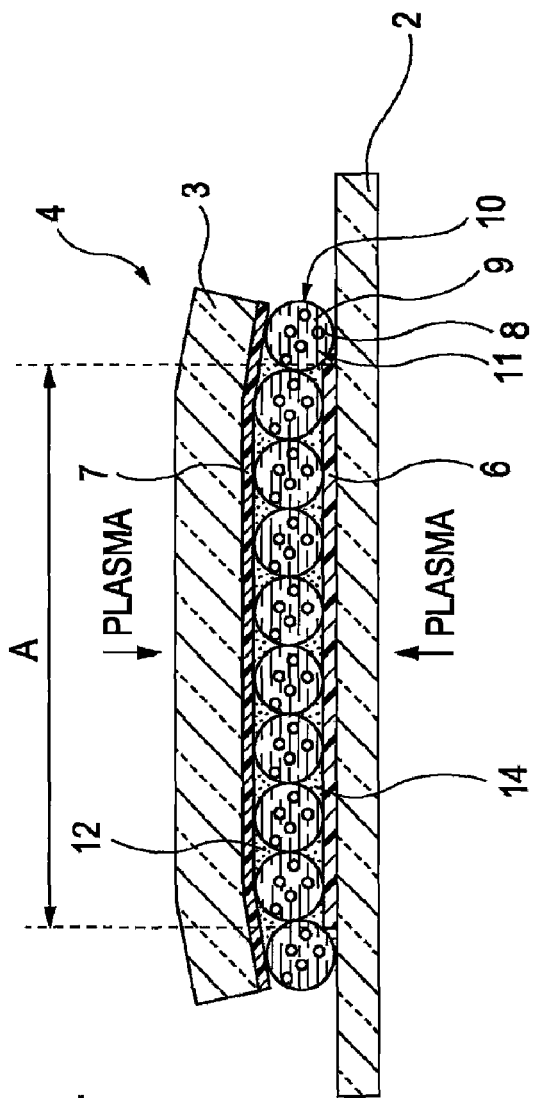
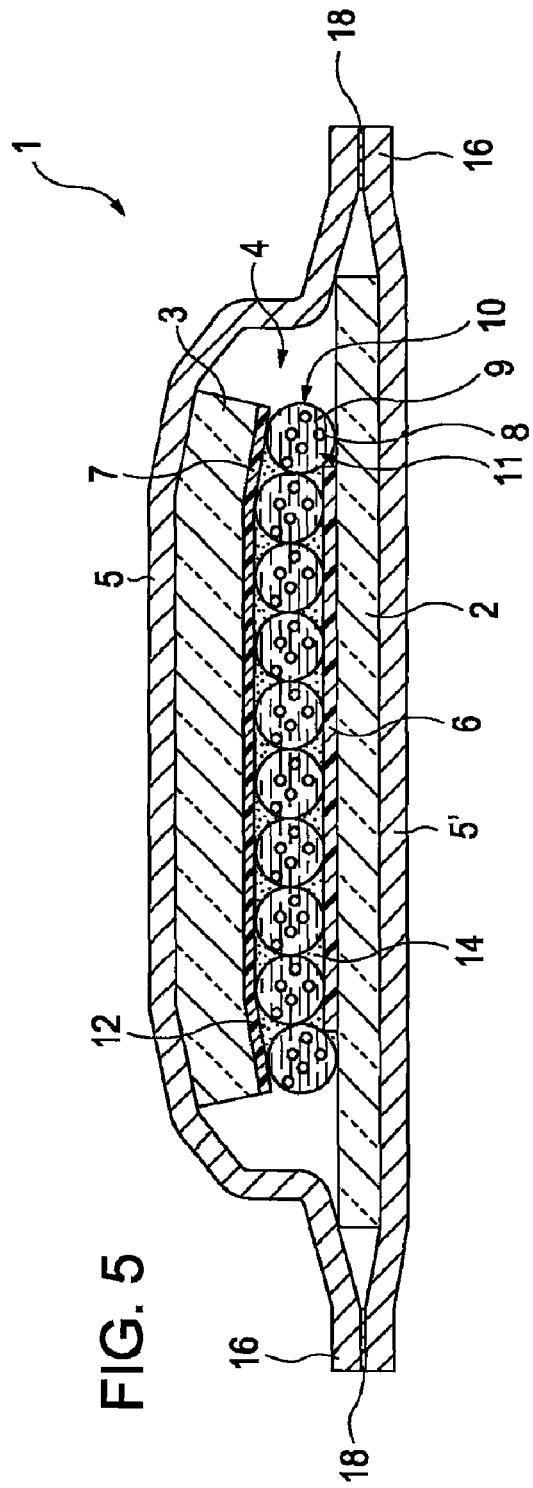

ELECTRONIC APPARATUS AND METHOD FOR MANUFACTURING ELECTRO-OPTICAL DEVICE

BACKGROUND

1. Technical Field

Several aspects of the present invention relate to a method for manufacturing an electro-optical device and also relates to an electronic apparatus.

2. Related Art

Electrophoretic displays have been known as electro-optical devices and each contain an electrophoretic dispersion which is a display material having optical properties varied by electrical stimulation which contains a liquid dispersion medium and electrophoretic particles. The application of an electric field to the electrophoretic dispersion varies the distribution of the electrophoretic particles to vary optical properties of the electrophoretic dispersion.

The electrophoretic displays require no backlights; hence, the electrophoretic displays can be manufactured at low cost and have a reduced thickness. Furthermore, the electrophoretic displays have a wide viewing angle, a high contrast ratio, and a function of holding a displayed image. Therefore, the electrophoretic displays are attracting much attention as next-generation display devices.

Some of the electrophoretic displays each include a transparent substrate having a transparent common electrode; a substrate having pixel electrodes; and microcapsules, sandwiched between these substrates, containing the electrophoretic dispersion.

The electrophoretic dispersion is sealed in the microcapsules. Therefore, the electrophoretic dispersion can be prevented from leaking out of the microcapsules during the manufacture of the electrophoretic displays and the electrophoretic particles can be prevented from precipitating or aggregating. These substrates are made of plastic or the like in view of flexibility, cracking resistance, and weight reduction. In recent years, the microcapsulation of dispersions has been widely used.

JP-A-64-86116 discloses an electrophoretic display including a pair of substrates and microcapsules containing a dispersion containing electrophoretic particles, at least one of the substrates being transparent, the microcapsules being sandwiched between the substrates.

JP-A-10-149118 discloses an electrophoretic display including a transparent substrate, an opaque rear substrate opposed to the transparent substrate, and a large number of microcapsules. These substrates have opposed faces having transparent electrodes. The microcapsules are placed in closed spaces present between the transparent electrodes.

The microcapsulation of dispersions facilitates the sealing treatment of the dispersions and is useful in obtaining good images.

In recent years, it has been proposed that the electrophoretic displays are used in a curved state. FIG. 8 shows a conventional curved electrophoretic display 70. In a method for manufacturing the electrophoretic display 70, a display 72 sealed between a pair of protective films 71 and 71' is directly bent and therefore the residual stress caused by bending is applied to a sealing section 73. This causes the protective film 71' to be released from an inner substrate 74, covered with the protective film 71', having a small radius of curvature or to be wrinkled. Although the protective film 71' is initially bonded tightly to the inner substrate 74, the protective film 71' is released from the inner substrate 74 or wrinkled while the protective film 71' is used for a long time in a curved state. The tension of the protective film 71' bonded to the inner substrate 74 is reduced by bending; hence, the protective film 71' has released portions or wrinkles. The released portions or wrinkles cause cracks, which cause problems such as the deterioration of water resistance. This can cause display failure or other problems; hence, long-term reliability cannot be assured.

SUMMARY

An advantage of a aspect of the invention is to provide a method for manufacturing an electro-optical device in which a protective film can be well attached to a curved substrate and which has long-term reliability. An advantage of another aspect of the invention is to provide an electronic apparatus.

The present invention provides a method for manufacturing an electro-optical device which includes a pair of substrates holding a display material having optical properties varied by electric stimulation and which has a curved shape. The method includes covering the front and rear faces of a display with a pair of protective films and then bonding end portions of the protective films to each other with an adhesive containing a thermoplastic resin, the end portions being located outside the display; heating the bonded end portions to melt the adhesive and then bending the display depending on applications; and solidifying the melted adhesive by cooling to allow the protective films to hold the display bent.

According to the method, before the display is bent, the adhesive placed between the protective films temporally bonded to each other is melted by heating; hence, the residual stress applied to the protective films, particularly to the bonded end portions, can be reduced when the display is bent. That is, the melting of the adhesive reduces the adhesion between the protective films and therefore contacts (connections) between the protective films are slightly shifted when the protective films are deformed so as to follow the curvature of the display. This allows the protective films to be tightly attached to outer faces of the substrates. In particular, the tension of one of the protective films is reduced, the one being attached to one of the substrates that is located inside the other one and that has a small radius of curvature after the display is bent. This prevents the protective films from being delaminated or wrinkled even if the electro-optical device is used in a curved state. Therefore, the protective films can be tightly attached to the substrates. This prevents the water resistance of the electro-optical device from being deteriorated by delamination or the like and also prevents display failures due to the deterioration of the water resistance thereof. Therefore, the electro-optical device has long-term reliability.

In the method, the display is preferably bent in such a manner that contacts between the protective films are shifted. Since the display is bent in such a manner that the contacts therebetween are shifted, the residual stress applied to the bonded end portions can be reduced. Therefore, the protective films can be tightly attached to the substrates. This prevents the water resistance of the electro-optical device from being deteriorated due to delamination or the like and also prevents display failures due to the deterioration of the water resistance thereof to allow the electro-optical device to have long-term reliability.

The method preferably further includes subjecting outer faces of the substrates opposed to each other to dry surface activation treatment in advance of covering the display with the protective films.

In this case, the outer faces of the substrates are preferably plasma-treated during the dry surface activation treatment.

Since the substrates are subjected to dry surface activation treatment, organic substances are removed from the outer faces thereof and wettability is imparted to the substrates. This enhances adhesion properties of the protective films to increase the adhesion of the protective films to the substrates. Therefore, when the display is bent, the protective films can be prevented from being delaminated or wrinkled. This leads to an increase in durability. If the species of gas for generating plasma and/or conditions for generating plasma are appropriately selected when the substrates are plasma-treated, the substrates can be reformed so as to have surface properties suitable for applications. For example, the outer face of one of the substrates can be reformed so as to have wettability higher than the outer face of the other one that is located outside the former one when the display is bent.

An electronic apparatus according to the present invention includes an electro-optical device manufactured by the above method.

In this electro-optical device, protective films can be tightly attached to substrates. Therefore, the electronic apparatus has high reliability and quality.

BRIEF DESCRIPTION OF THE DRAWINGS

The invention will be described with reference to the accompanying drawings, wherein like numbers reference like elements.

FIG. 3 is a sectional view showing a step of bonding the first and second substrates with a vacuum laminator.

FIG. 4 is a sectional view showing a step of plasma-treating the front and rear faces of a display (outer faces of the first and second substrates).

FIG. 5 is a sectional view showing a step of covering the display with a pair of protective films.

DESCRIPTION OF EXEMPLARY EMBODIMENTS

Embodiments of the present invention will now be described in detail with reference to accompanying drawings.

First Embodiment

Figure 1:
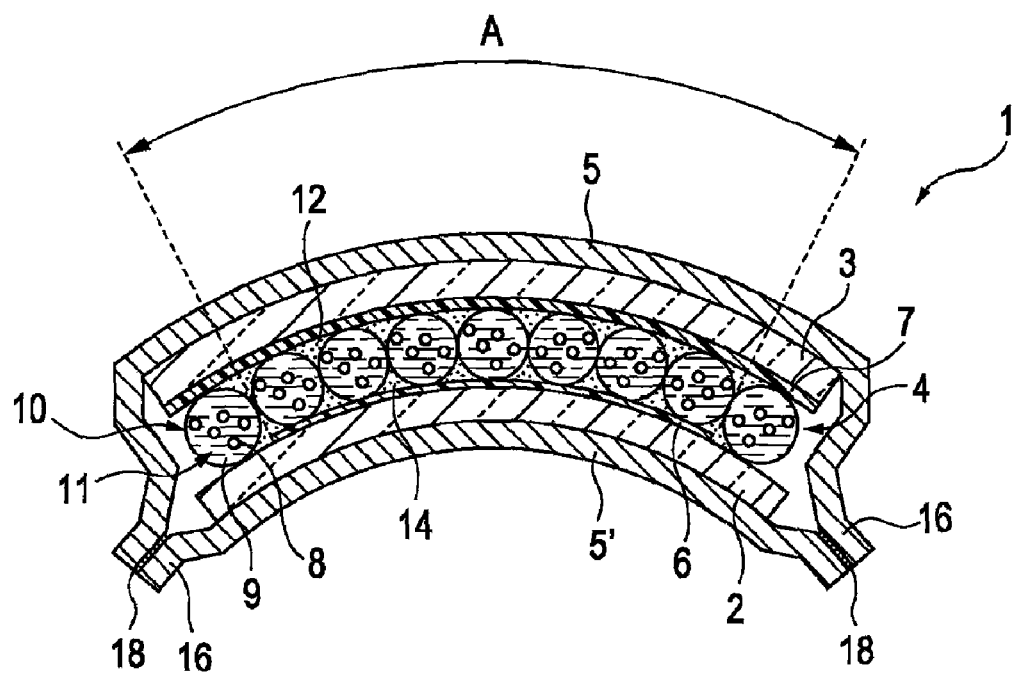
FIG. 1 is a sectional view of an electro-optical device manufactured by a method according to a first embodiment of the present invention.

FIG. 1 shows an electro-optical device manufactured by a method according to a first embodiment of the present invention. The electro-optical device is a type of electrophoretic display. With reference to FIG. 1, the electro-optical device is represented by reference numeral 1 and is curved in side view. The electro-optical device 1 includes a first protective film 5, a second protective film 5', and a display 4 enveloped therebetween. The display 4 includes a first substrate 2 including segment electrodes 6, a second substrate 3 including a common electrode 7, and a large number of microcapsules 10 containing an electrophoretic dispersion 11 containing a liquid dispersion medium 9 and electrophoretic particles 8. The electrophoretic dispersion 11 is a display material having optical properties varied by electrical stimulation. The electro-optical device 1 displays an image in such a manner that the distribution of the electrophoretic particles 8 is varied by applying an electric field to the electrophoretic dispersion 11.

In order to show layers and members on a recognizable scale in FIG. 1, different scales are used depending on the size of the layers and members.

The first and second substrates 2 and 3 each include a film- or sheet-shaped flexible resin plate. The first and second substrates 2 and 3 have outer faces subjected to surface activation treatment. Examples of such surface activation treatment include plasma treatment and ultraviolet light treatment. In this embodiment, plasma treatment such as oxygen ($O_2$) plasma treatment or atmospheric pressure plasma treatment is performed.

In this embodiment, the second substrate 3 serves as a screen for displaying an image viewed by an observer. The second substrate 3 is made of a transparent material having high transmittance. Preferred examples of such a transparent material include polyesters such as polyethylene terephthalate (PET) and polyethylene naphthalate (PEN), polyethersulfone (PES), polycarbonate (PC), and polyethylene (PE).

The common electrode 7 extends over an inner face of the second substrate 3. The common electrode 7 can be formed by a vapor deposition process or another process. Examples of a material for forming the common electrode 7 include conductive oxides such as indium tin oxide (ITO), electronic conductive polymers such as polyaniline, and ion-conductive polymers prepared by dispersing ionic substances such as NaCl, $LiClO_4$, and KCl in matrix resins such as polyvinyl alcohol and polycarbonate. In this embodiment, ITO is preferably used.

The first substrate 2 is opposed to the second substrate 3 and has no display function. The first substrate 2 need not be transparent or need not have high light transmittance. Examples of a material for forming the first substrate 2 include liquid-crystalline polymers and resins such as polyimide (PI), polyvinyl chloride (PVC), polystyrene (PS), polypropylene (PP), PC, polyether ether ketone (PEEK), an acrylic resin, and polyacrylate in addition to the material for forming the second substrate 3.

The segment electrodes 6 are arranged on an inner face of the first substrate 2 and have a predetermined shape. In order to provide a margin on the first substrate 2 when the segment electrodes 6 are formed, a space is provided between the edge of the first substrate 2 and the segment electrodes 6. The inner face of the first substrate 2 that has the space is stepped from the segment electrodes 6. Examples of a material for forming the segment electrodes 6 include conductive oxides such as ITO; electronic conductive polymers such as polyaniline and ion-conductive polymers prepared by dispersing ionic substances such as NaCl, $LiClO_4$, and KCl in matrix resins such as polyvinyl alcohol and polycarbonate; and metals such as aluminum, copper, gold, silver, platinum, nickel, and tin. In this embodiment, the segment electrodes 6 are formed by patterning a copper layer.

With reference to FIG. 1, the microcapsules 10 are sandwiched between the first and second substrates 2 and 3 so as to be arranged on the segment electrodes 6. The microcapsules 10 contain the electrophoretic dispersion 11, which contains the liquid dispersion medium 9 and the electrophoretic particles 8 dispersed therein as described above, and have substantially the same diameter. In this embodiment, the microcapsules 10 have a diameter of about 50 μm. In order to fill a display region A defined by the segment electrodes 6 with the microcapsules 10, some of the microcapsules 10 are arranged outside the display region A, whereby the margin is secured. The second substrate 3 holds the microcapsules 10 in cooperation with the first substrate 2 and is bonded to the microcapsules 10 so as to extend along an array of the microcapsules 10 as shown in FIG. 1.

The electrophoretic dispersion 11 is sealed in the microcapsules 10. Optical properties of the electrophoretic dispersion 11 are varied in such a manner that the distribution of the electrophoretic particles 8 is varied by the application of an electric field.

Examples of the liquid dispersion medium 9 include water; alcoholic solvents such as methanol, ethanol, isopropanol, butanol, octanol, and methylcellosolve; esters such as ethyl acetate and butyl acetate; ketones such as acetone, methyl ethyl ketone, and methyl isobutyl ketone; aliphatic hydrocarbons such as pentane, hexane, and octane; alicyclic hydrocarbons such as cyclohexane and methylcyclohexane; aromatic hydrocarbons such as benzene, toluene, xylene, and long-chain alkylbenzenes including hexylbenzene, heptylbenzene, octylbenzene, nonylbenzene, decylbenzene, undecylbenzene, undecylbenzene, dodecylbenzene, tridecylbenzene, and tetradecylbenzene; halohydrocarbons such as methylene chloride, chloroform, carbon tetrachloride, and 1,2-dichloroethane; carboxylates; various oils; and mixtures of these compounds and surfactants. These compounds may be used alone or in combination.

The electrophoretic particles 8 electrophoretically migrate in the liquid dispersion medium 9 depending on the potential difference and are organic or inorganic (polymeric or colloidal).

The electrophoretic particles 8 may contain one or more of the following pigments: black pigments such as aniline black, carbon black, and titanium black; white pigments such as titanium dioxide, zinc oxide, and antimony trioxide; azo pigments such as monoazo pigments, disazo pigments, and polyazo pigments; yellow pigments such as isoindolinone, chrome yellow, yellow iron oxide, cadmium yellow, titanium yellow, and antimony; red pigments such as quinacridone red and chromium vermilion; blue pigments such as phthalocyanine blue, indanthrene blue, anthraquinone dyes, iron blue, ultramarine blue, and cobalt blue; green pigments such as phthalocyanine green; and the like.

These pigments may be used in combination with a charge control agent containing particles of an electrolyte, a surfactant, a metal soap, resin, rubber, varnish, or a compound; a dispersant such as a titanium coupling agent, an aluminum coupling agent, or a silane coupling agent; a lubricant; a stabilizer; or the like as required.

The shells of the microcapsules 10 may be made of an gum arabic-gelatin composite material, an urethane resin, a melamine resin, a urea resin, or the like.

In the electro-optical device 1, some of the electrophoretic particles 8 are negatively charged and the others are positively charged. The negatively or positively charged electrophoretic particles 8 contain, for example, titanium dioxide that is a white pigment or carbon black that is a black pigment, respectively. When a character such as a number is displayed, the electrophoretic particles 8 containing carbon black are arranged to form the character. When the electrophoretic particles 8 have a single color, an image may be displayed by collecting the electrophoretic particles 8 near the common electrode 7 or the segment electrodes 6.

The microcapsules 10 are fixed on predetermined regions of the common electrode 7 with a binder 12. The binder 12 has good affinity to the shells of the microcapsules 10, adheres tightly to the common electrode 7, and is insulative.

Examples of the binder 12 include thermoplastic resins such as polyethylene, chlorinated polyethylene, ethylene-vinyl acetate copolymers, ethylene-ethyl acrylate copolymers, polypropylene, ABS resins, polymethyl methacrylate, polyvinyl chloride, vinyl chloride-vinyl acetate copolymers, vinyl chloride-vinylidene chloride copolymers, vinyl chloride-acrylic ester copolymers, vinyl chloride-methacrylic acid copolymers, vinyl chloride-acrylonitrile copolymers, ethylene-vinyl alcohol-vinyl chloride copolymers, propylene-vinyl chloride copolymers, polyvinylidene chloride, polyvinyl acetate, polyvinyl alcohol, polyvinyl formal, and cellulose resins; polymers such as polyamide, polyacetal, polycarbonate, polyethylene terephthalate, polybutylene terephthalate, polyphenylene oxide, polysulfone, polyamidoimide, polyaminobismaleimide, polyethersulfone, polyphenylenesulfone, polyarylate, graft polyphenylene ether, polyetherether ketone, and polyetherimide; fluorocarbon resins such as polytetrafluoroethylene, a fluorinated ethylene-propylene copolymer, tetrafluoroethylene-perfluoroalkoxyethylene copolymers, ethylene-tetrafluoroethylene copolymers, polyfluorovinylidene, polytrifluorochloroethylene, and fluorocarbon rubber; silicones such as silicone resins and silicone rubber; and other polymers such as methacrylate-styrene copolymers, polybutylene, and methyl methacrylate-butadiene-styrene copolymers.

The microcapsules 10 are also fixed above the segment electrodes 6 and regions of the first substrate 2 with an adhesive sheet 14 made of a thermoplastic resin. That is, the adhesive sheet 14 to is attached to the microcapsules 10 fixed above the second substrate 3, whereby the microcapsules 10 are fixed above the first substrate 2.

The first and second protective films 5 and 5' are laminated such that the display 4 is sandwiched between the first and second protective films 5 and 5', that is, the front and rear faces of the display 4 are covered with the first and second protective films 5 and 5'. End portions of the first and second protective films 5 and 5' are bonded to each other with an adhesive 18 such that the display 4 is sealed between the first and second protective films 5 and 5'. The bonded end portions form a sealing section 16. In this embodiment, the edges of the first and second protective films 5 and 5' are entirely bonded to each other so as to form the sealing section 16. The sealing section 16 entirely surrounds the display 4. The sealing section 16 can be formed by a fusion technique such as laser beam irradiation or ultrasonic treatment. That is, the sealing section 16 is formed in such a manner that the adhesive 18 is provided between the first and second protective films 5 and 51, fused by laser beam irradiation or ultrasonic treatment, and then solidified by cooling.

With reference to FIG. 1, the first and second protective films 5 and 5' are deformed so as to follow the curvature of the first and second substrates 2 and 3. The second protective film 5' is tightly bonded to an outer face of the first substrate 2 and the first protective film 5 is tightly bonded to an outer face of the second substrate 3.

The first and second protective films 5 and 5' have, for example, a rectangular shape and a size sufficient to entirely cover the display 4. The first and second protective films 5 and 5' each include a resin layer made of a polymer and a barrier layer made of an inorganic material, that is, the first and second protective films 5 and 5' have a two-layer structure. In order to seal the display 4 between the first and second protective films 5 and 5', the barrier layer is placed inside the resin layer, that is, the barrier layer is placed closer to the first and second substrates 2 and 3 than the resin layer. If the barrier layer is placed outside the resin layer, moisture may penetrate the first and second protective films 5 and 5' through defects that may be caused in the barrier layer. However, since the barrier layer is placed inside the resin layer, the resin layer can prevent the penetration of moisture even if the barrier layer has defects. Although the resin layer has high moisture barrier properties, the resin layer can be hygroscopic. If the resin layer is placed closer to the first and second substrates 2 and 3 than the barrier layer, moisture absorbed in the resin layer can enter the display 4. However, since the resin layer is placed farther from the first and second protective films 5 and 5' than the barrier layer, moisture absorbed in the resin layer can be prevented from entering the display 4.

Examples of a material for forming the barrier layer include inorganic materials such as silicon dioxide, silicon nitride, aluminum oxide, and titanium oxide and metal materials such as aluminum, copper, and Kovar.

Examples of a material for forming the resin layer include polyesters such as PET and PEN; resins such as PE, PP, PES, and PC; and laminates including resin films and metal thin-films or sheets such as aluminum sheets, copper sheets, and Kovar sheets.

The adhesive 18 is placed between the end portions of the first and second protective films 5 and 5' so as to surround the display 4. The end portions of the first and second protective films 5 and 5' are bonded to each other with the adhesive 18, whereby the display 4 is sealed. The adhesive 18 preferably contains a thermoplastic resin such as a vinyl polymer, a cellulose polymer, or an acrylic polymer and may further contain an inorganic filler such as silicon nitride.

The method of this embodiment will now be described in detail with reference to FIGS. 1 to 5.

A procedure for forming the display 4 will first be briefly described.

The first substrate 2 is prepared from flexible polyimide or another polymer so as to have a rectangular shape. The segment electrodes 6 are formed in the display region A of the first substrate 2 by a semi-additive process or another process. The second substrate 3 is prepared from PET, which is a flexible transparent material, so as to have a rectangular shape. The common electrode 7 is formed from ITO over the inner face of the second substrate 3 by a vapor deposition process.

The microcapsules 10 are fixed on the common electrode 7 with the binder 12 by a printing process or the like. The adhesive sheet 14 is attached to the first substrate 2 and the segment electrodes 6 arranged thereon.

Figure 2:
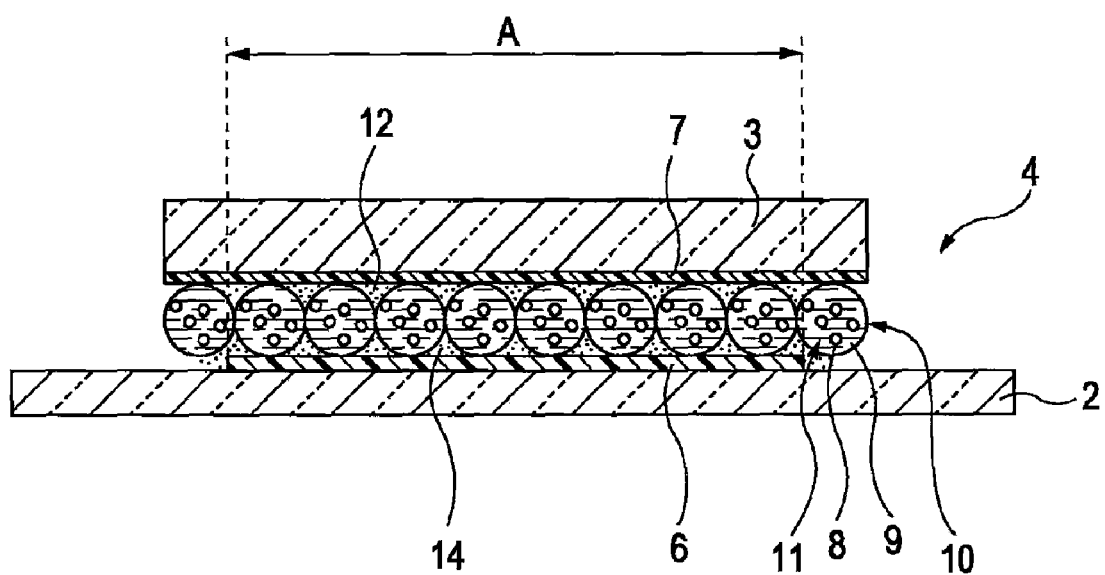
FIG. 2 is a sectional view showing a step of bonding a first substrate to a second substrate.

A substrate-bonding step is then performed as described below. As shown in FIG. 2, the second substrate 3 is provided above the first substrate 2 such that the adhesive sheet 14 is opposed to the microcapsules 10. The second substrate 3 is pressed against the first substrate 2. In this operation, the first and second substrates 2 and 3 are conveyed into a vacuum laminator 19 and then laminated as shown in FIG. 3.

With reference to FIG. 3, the vacuum laminator 19 includes a press unit 23 and a vacuum unit connected thereto. The press unit 23 includes an upper clamping member 21 including a first heater and a lower clamping member 22, opposed to the upper clamping member 21, including a second heater.

A damper 25 made of silicone rubber or the like underlies the lower face of the upper clamping member 21. The lower clamping member 22 can be inflated with air like a balloon and is made of, for example, silicone rubber. The lower clamping member 22 can be brought into contact with the first substrate 2 in such a manner that the inflation of the lower clamping member 22 is controlled by blowing air into the lower clamping member 22, whereby the first substrate 2 can be uniformly pressed. The use of the damper 25 and the lower clamping member 22 allows the first and second substrates 2 and 3 to be pressed against each other properly and uniformly without applying an excessive load to the microcapsules 10.

In order to laminate the first and second substrates 2 and 3, the vacuum laminator 19 containing the first and second substrates 2 and 3 is evacuated with the vacuum unit. The lower clamping member 22 is inflated with air simultaneously with the evacuation of the vacuum laminator 19, so that the damper 25 and the lower clamping member 22 are elastically deformed so as to follow the shape of the display 4, whereby the first and second substrates 2 and 3 are uniformly pressed against each other. The upper and lower clamping members 21 and 22 are heated to, for example, about 100° C. with the first and second heaters, whereby the adhesive sheet 14 is melted. The melted adhesive sheet 14 is bonded to the microcapsules 10, whereby the first and second substrates 2 and 3 are laminated.

As described above, the first and second substrates 2 and 3 opposed to each other are clamped between the upper and lower clamping members 21 and 22 and then heat-pressed against each other, whereby the display 4, in which the microcapsules 10 are sandwiched between the first and second substrates 2 and 3 and which has a rectangular shape in plan view, is prepared.

A surface treatment step is then performed as described below. As shown in FIG. 4, in order to enhance the adhesion between the first and second substrates 2 and 3 and the first and second protective films 5 and 5', the outer faces of the first and second substrates 2 and 3 are plasma-treated. In this embodiment, the laminated first and second substrates 2 and 3 are subjected to such plasma treatment just before the display 4 is covered with the first and second protective films 5 and 5'.

Plasma treatment used herein is a type of dry surface activation treatment using plasma generated by applying an electric field to low-pressure or atmospheric pressure gas. The display 4 is conveyed into a plasma treatment system (not shown). After the plasma treatment system is evacuated, a plasma-generating gas such as gaseous oxygen is introduced into the resulting plasma treatment system. A high-frequency voltage is applied to the plasma-generating gas, whereby plasma is generated in the plasma treatment system. The front and rear faces of the display 4 are activated with ions and/or electrons generated by the plasma. This removes organic substances and the like from the outer faces of the first and second substrates 2 and 3 to impart wettability to the first and second substrates 2 and 3. Gas used for plasma treatment can be selected depending on the materials for the first and second substrates 2 and 3.

The first and second substrates 2 and 3 may be surface-treated before the first and second substrates 2 and 3 are laminated. The use of the first and second substrates 2 and 3 surface-treated in advance simplifies the manufacture of the electro-optical device 1.

A protective film-laminating step is then performed. The adhesive 18 is applied to portions of the inner faces of the first and second protective films 5 and 5' prepared in advance, the portions corresponding to the sealing section 16. In particular, the adhesive 18 is provided on the end portions of the first and second protective films 5 and 5', which have a size greater than that of the first and second substrates 2 and 3. The first and second protective films 5 and 5' are provided on the front and rear faces, respectively, of the display 4 such that the inner faces of the first and second protective films 5 and 5' are opposed to each other. In this operation, the first protective film 5 is provided on the outer face of the second substrate 3 and the second protective film 5' is provided on the outer face of the first substrate 2 such that the first and second protective films 5 and 5' are aligned with each other.

The display 4 is sandwiched between the first and second protective films 5 and 5', which are in contact with the outer face of the second substrate 3 and that of the first substrate 2, respectively.

The display 4 sandwiched between the first and second protective films 5 and 5' is conveyed into the vacuum laminator 19 shown in FIG. 3 and then provided into the press unit 23, which is then evacuated with the vacuum unit.

The lower clamping member 22 is inflated with air simultaneously with the evacuation of the press unit 23, whereby the damper 25 and the lower clamping member 22 are deformed so as to follow the shape of the display 4. This causes the first and second protective films 5 and 5' located on both sides of the display 4 to expand or contract, whereby the first and second protective films 5 and 5' are bonded to each other with the adhesive sheet 14. Furthermore, the end portions of the first and second protective films 5 and 5' are bonded to each other with the adhesive 18, whereby the sealing section 16 is formed so as to surround the display 4. This allows the first and second protective films 5 and 5' to be laminated such that the first and second protective films 5 and 5' are attached to the outer face of the second substrate 3 and that of the first substrate 2, respectively, as shown in FIG. 5.

Since the first and second substrates 2 and 3 are plasma-treated before the first and second protective films 5 and 5' are laminated, the first and second protective films 5 and 5' are laminated in such a state that the outer faces of the first and second substrates 2 and 3 are well activated. This allows the first and second protective films 5 and 5' to be tightly attached to the outer face of the second substrate 3 and that of the first substrate 2, respectively.

A bending step is then performed. The resulting display 4 is globally heated with a heater or the like. This causes the adhesive 18 in the sealing section 16 to be melted, thereby reducing the adhesion between the first and second protective films 5 and 5'. The display 4 is then bent such that both ends of the display 4 are located lower than the center thereof. That is, the display 4 is bent so as to have a predetermined radius of curvature depending on the usage of the display 4 as shown in FIG. 1.

Since the adhesion between the first and second protective films 5 and 5' attached to the display 4 is reduced by the melting of the adhesive 18, the first and second protective films 5 and 5' are deformed so as to follow the curvature of the display 4 in such a state that the first and second protective films 5 and 5' are maintained in contact with the second substrate 3 and the second substrate 3 and the first substrate 2, respectively. When the first and second protective films 5 and 5' are deformed, contacts (connections) between the first and second protective films 5 and 5' that correspond to the sealing section 16 are shifted. The first protective film 5 is tightly attached to the outer face of the second substrate 3 because an appropriate tension created by bending the display 4 is applied to the first protective film 5. On the other hand, the second protective film 5' is tightly attached to the outer face of the first substrate 2 because the tension of the second protective film 51 is not varied or reduced by a residual stress that is caused if the second protective film 5' is fixed to the first protective film 5. This is unlike conventional techniques.

The display 4 is bent in such a manner that the first and second protective films 5 and 5' are tightly attached to the outer face of the second substrate 3 and that of the first substrate 2, respectively.

Since the display 4 is globally heated, the adhesive sheet 14 overlying the segment electrodes 6 is melted; hence, the adhesion between the first substrate 2 and the microcapsules 10 is reduced. Therefore, the display 4 can be smoothly bent in such a manner that the balance between the first and second substrates 2 and 3 is maintained. This prevents the microcapsules 10 from being damaged.

A curved shape-holding step is then performed. The heating of the bent display 4 is stopped. The display 4 may be cooled with a cooling unit as required. The melted adhesive 18 is solidified, whereby the first and second protective films 5 and 5' are tightly bonded to each other at the sealing section 16 again. The first and second protective films 5 and 5' cause the display 4 to be held bent as shown in FIG. 1. The solidification of the adhesive sheet 14 increases the force holding the display 4 bent.

Since the outer faces of the first and second substrates 2 and 3 are plasma-treated, the first and second protective films 5 and 5' can be tightly attached to the second substrate 3 and the first substrate 2, respectively. Hence, no gap is caused between the first and second substrates 2 and 3 while the display 4 is held bent for a long time. As described above, the electro-optical device 1 is manufactured. The electro-optical device 1 is prevented from being deteriorated in quality and moisture resistance.

According to the method of this embodiment, the adhesive 18, which is placed between the first and second protective films 5 and 5' temporally bonded to each other in the protective film-laminating step, is melted by heating in the bending step; hence, the residual stress applied to the first and second protective films 5 and 5', particularly to the sealing section 16, can be reduced when the display 4 is bent. That is, the melting of the adhesive 18 reduces the adhesion between the first and second protective films 5 and 5' and therefore the contacts between the first and second protective films 5 and 5' are slightly shifted when the first and second protective films 5 and 5' are deformed so as to follow the curvature of the display 4. This allows the first and second protective films 5 and 5' to be tightly attached to the outer face of the second substrate 3 and that of the first substrate 2, respectively. In particular, the tension of the second protective film 5', which is attached to the first substrate 2 that is located inside the second substrate 3 when display 4 is bent, is reduced. This prevents the first and second protective films 5 and 5' from being delaminated or wrinkled even if the electro-optical device 1 is used in a curved state. Therefore, the first and second protective films 5 and 5' can be tightly attached to the second substrate 3 and the first substrate 2, respectively. This prevents the water resistance of the electro-optical device 1 from being deteriorated by delamination or the like and also prevents display failures due to the deterioration of the water resistance thereof. Therefore, the electro-optical device 1 has long-term reliability.

Since the first and second substrates 2 and 3 are surface-treated, organic substances can be removed from the outer faces of the first and second substrates 2 and 3 and wettability is imparted to the first and second substrates 2 and 3. This enhances adhesion properties of the first and second protective films 5 and 5' to increase the adhesion of the first protective film 5 to the second substrate 3 and that of the second protective film 5' to the first substrate 2. Therefore, although the display 4 is bent, the first and second protective films 5 and 5' can be prevented from being delaminated or wrinkled. In the above plasma treatment, if the species of gas for generating plasma and/or conditions for generating plasma are appropriately selected, the first and second substrates 2 and 3 can be reformed so as to have surface properties suitable for applications. For example, the outer face of the first substrate 2, which is located inside the second substrate 3 when the display 4 is bent, can be reformed so as to have wettability higher than that of the second substrate 3.

Second Embodiment

An electronic apparatus according to a second embodiment of the present invention will now be described. The electronic apparatus includes an electro-optical device manufactured by the method according to the first embodiment. Examples of the electronic apparatus are as described below.

Figure 6:
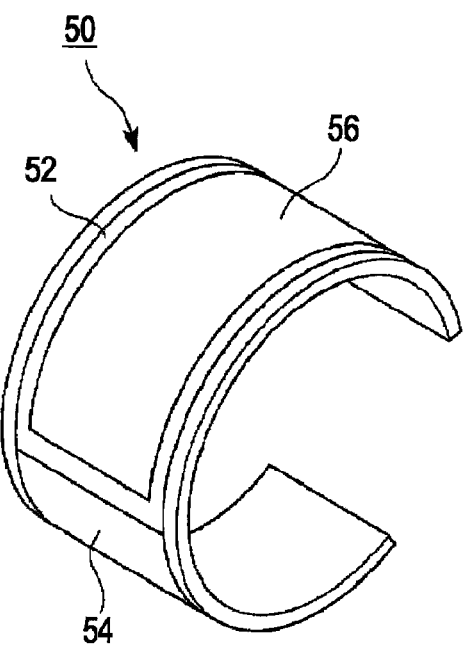
FIG. 6 is a perspective view of a wristwatch that is an example of an electronic apparatus according to a second embodiment of the present invention.

FIG. 6 shows a wristwatch 50 that is an example of the electronic apparatus in perspective view. With reference to FIG. 6, the wristwatch 50 includes a display section 56 for displaying a time, a watch case 52 for accommodating the display section 56, and a watch belt 54 attached to the watch case 52. The display section 56 includes the electro-optical device and is curved. Therefore, the wristwatch 50 can be wound around an arm of a user.

Figure 7:
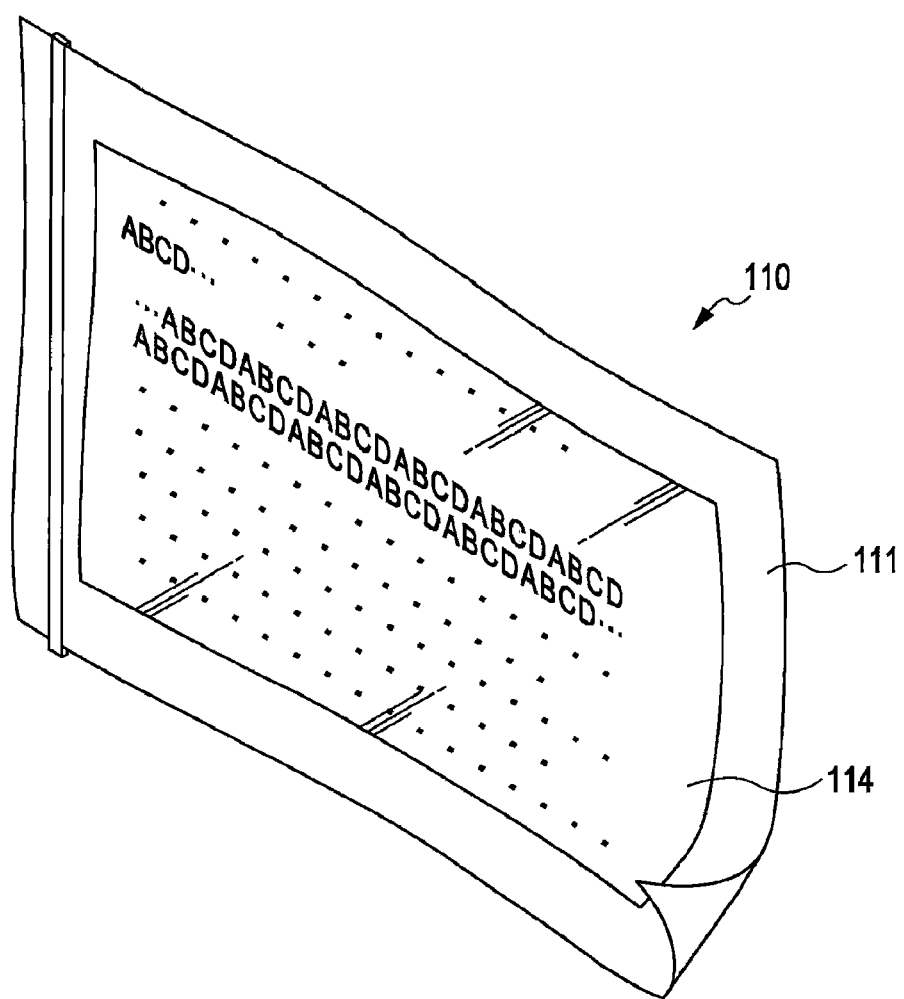
FIG. 7 is a perspective view of an electronic paper display that is an example of the electronic apparatus of the second embodiment.
Figure 8:
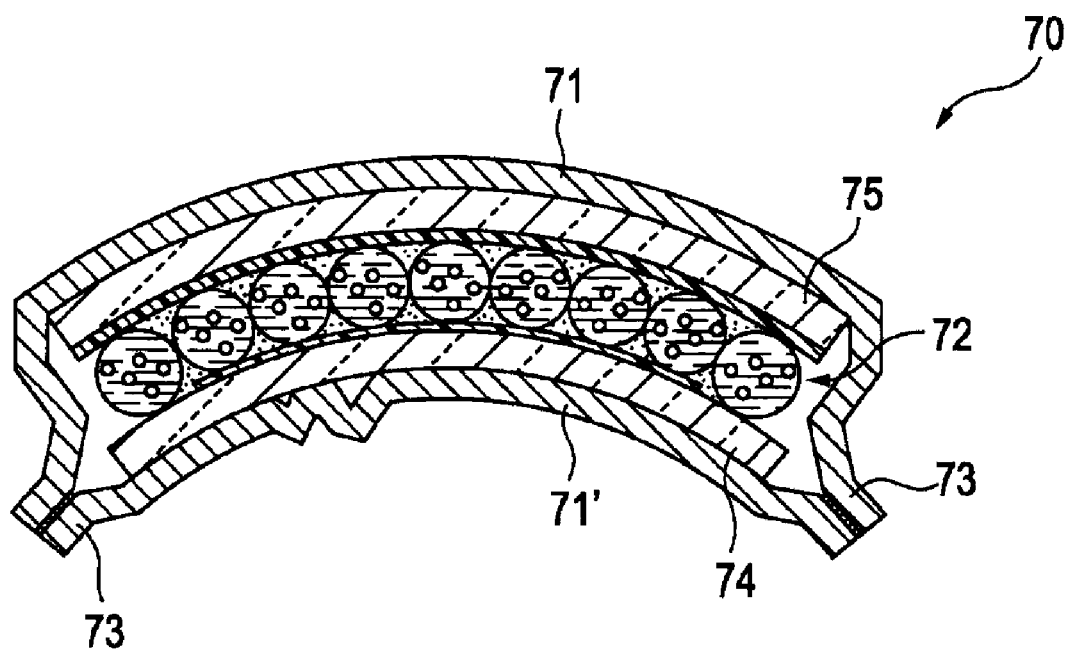
FIG. 8 is a sectional view of a conventional curved electrophoretic display.

FIG. 7 shows an electronic paper display 110 that is an example of the electronic apparatus in perspective view. The electronic paper display 110 includes a main body 111 including a rewritable sheet having the same texture and flexibility of paper and also includes a display unit including a display section 114. The display section 114 includes the electro-optical device.

Since the electronic apparatus includes the electro-optical device, the electro-optical device has high reliability and quality.

The electro-optical device can be applied to apparatuses having curved display sections in addition to the wristwatch 50 and electronic paper display 110.

The present invention is not limited to the above embodiments. Various modifications may be made within the scope of the present invention.

In the first embodiment, the microcapsules 10 are arranged between the first and second substrates 2 and 3. Instead, an electrophoretic dispersion layer may be placed between the first and second substrates 2 and 3. The electrophoretic dispersion layer contains the liquid dispersion medium 9 and the electrophoretic particles 8.

If a liquid crystal or organic electroluminescent compound, which is a display material having optical properties varied by electrical stimulation, is used, a method according to the present invention can be used to manufacture a liquid crystal display or an organic electroluminescent display.

The adhesive sheet 14 for bonding the first and second substrates 2 and 3 to each other need not overlie the segment electrodes 6 and may be attached to the microcapsules 10.

In the first embodiment, the first and second substrates 2 and 3 are bonded to each other and then plasma-treated. The first and second substrates 2 and 3 may be plasma-treated and then bonded to each other as described above. After the first and second substrates 2 and 3 are bonded to each other, that is, after the display unit 4 is prepared, the display unit 4 is bent. Instead, curved substrates can be used.

What is claimed is:

1. A method for manufacturing an electro-optical device which includes a pair of substrates holding a display material having optical properties varied by electric stimulation and which has a curved shape, the method comprising:
    covering the front and rear faces of a display with a pair of protective films and then bonding end portions of the protective films to each other with an adhesive containing a thermoplastic resin, the end portions being located outside the display;
    heating the bonded end portions to melt the adhesive and then bending the display depending on applications;
    solidifying the melted adhesive by cooling to allow the protective films to hold the display bent; and
    subjecting outer faces of the substrates opposed to each other to dry surface activation treatment in advance of covering the display with the protective films.

2. The method according to claim 1, wherein the display is bent in such a manner that contacts between the protective films are shifted.

3. The method according to claim 1, wherein the outer faces of the substrates are plasma-treated during the dry surface activation treatment.

* * * * *